J. SCHÜTTE.
PIPE JOINT.
APPLICATION FILED APR. 25, 1919.

1,420,669.

Patented June 27, 1922.
2 SHEETS—SHEET 1.

INVENTOR:
Johann Schütte

ATTORNEY.

J. SCHÜTTE.
PIPE JOINT.
APPLICATION FILED APR. 25, 1919.
1,420,669.
Patented June 27, 1922.
2 SHEETS—SHEET 2.
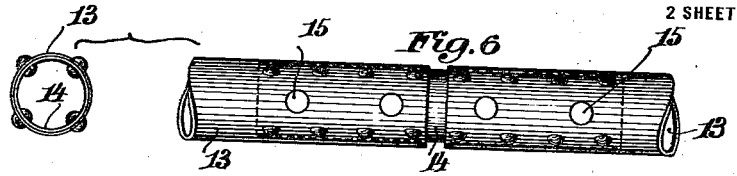
Fig. 6
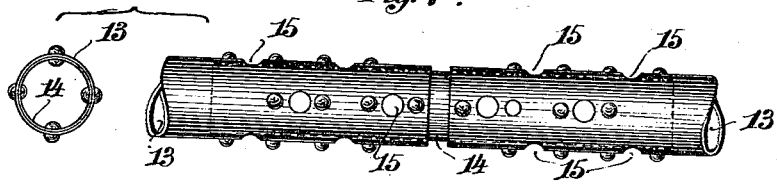
Fig. 7.
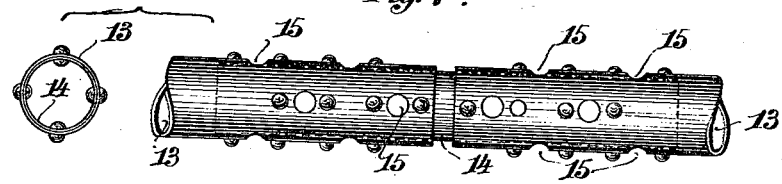
Fig. 8.
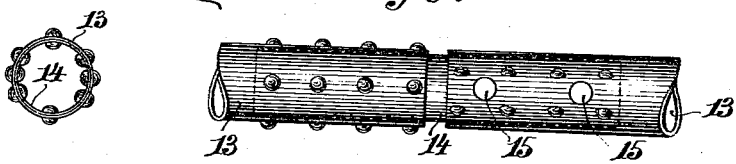
Fig. 9.
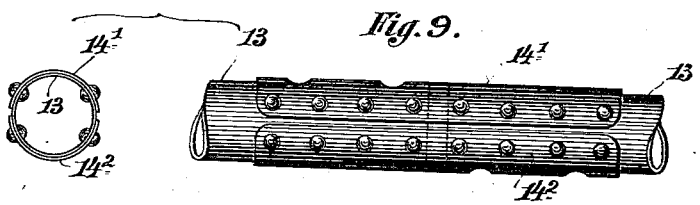
Fig. 10.
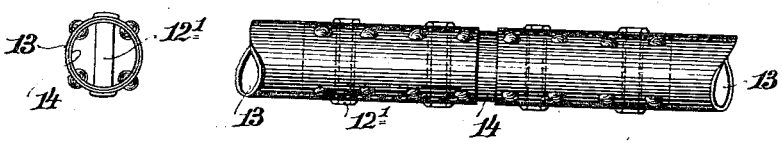
Fig. 11.
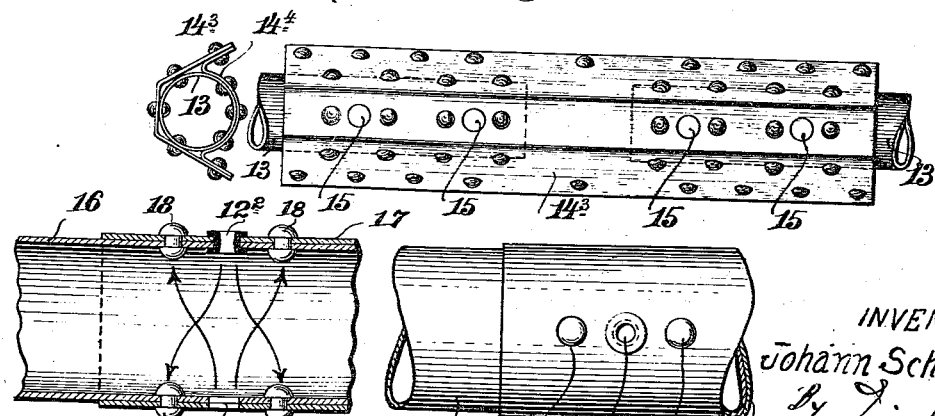
Fig. 12.   Fig. 13.
INVENTOR:
Johann Schütte
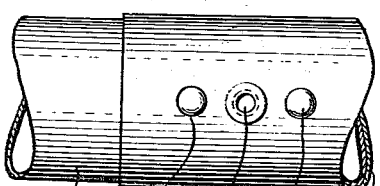
ATTORNEY

UNITED STATES PATENT OFFICE.

JOHANN SCHÜTTE, OF ZEESEN-KOENIGS-WUSTERHAUSEN, NEAR BERLIN, GERMANY, ASSIGNOR, BY MESNE ASSIGNMENTS, TO AMERICAN INVESTIGATION CORPORATION, OF NEW YORK, N. Y., A CORPORATION OF MARYLAND.

PIPE JOINT.

1,420,669.  Specification of Letters Patent. Patented June 27, 1922.

Application filed April 25, 1919. Serial No. 292,767.

*To all whom it may concern:*

Be it known that I, Dr. JOHANN SCHÜTTE, engineer, naval architect, citizen of the German Republic, residing at Zeesen-Koenigs-Wusterhausen, near Berlin, Germany, have invented certain new and useful Improvements in Pipe Joints (for which I have filed application in Germany, March 28, 1917, No. 317,029, Oct. 26, 1921), of which the following is a specification.

The present invention relates to improvements in pipe joints, such as are, for example, employed in making the pipe girders for rigid airships, the ties of which are made of closed pipes, coupled together by braces. The object of the improvements forming the subject matter of the present invention is to provide an easy and strong construction of the joints. The said improvements consist in arrangements as shown in the accompanying drawings and as will be hereinafter specified in the claims.

In the accompanying drawings:

Figure 6 shows a form of coupling or joint wherein the coupling member is arranged in overlapping relation and co-axial with the tubular members to be connected, the auxiliary holes being clearly shown.

Figure 7 is similar to Figure 6 but in this figure the arrangement of the holes and the rivets is varied slightly.

Figure 8 is also similar to Figure 6, but in this figure the coupling member is first riveted to one tubular member in the usual manner and then the other member is riveted thereto by the aid of the auxiliary holes.

Figure 9 is similar to Figure 6, but shows the coupling member arranged as fishplates, the auxiliary holes being also provided in this form.

Figure 10 shows how the auxiliary holes may be filled by hollow rivets after the usual rivets have been set.

Figure 11 shows a form similar to that shown in Figure 9, the coupling members being of different shape in this form.

Figure 12 is a transverse section of a tubular beam, showing how the auxiliary holes may be filled by short, hollow rivets after the usual rivets have been set.

Figure 13 is an exterior view of the parts shown in Figure 12.

The tubular girders are composed of pipes and braces riveted together. The riveting causes difficulties, if the favorable, closed cross section of the pipes forming the ties is to be maintained beyond the points at which the braces are joined. In order to obviate these difficulties in a simple manner and without reducing the strength of the main sections, holes are provided, according to the present invention, in pipes opposite to the riveted joints, and the joint plates are so shaped that the rivets and rivet set tools can be introduced into the pipes through the auxiliary holes.

Figure 1:
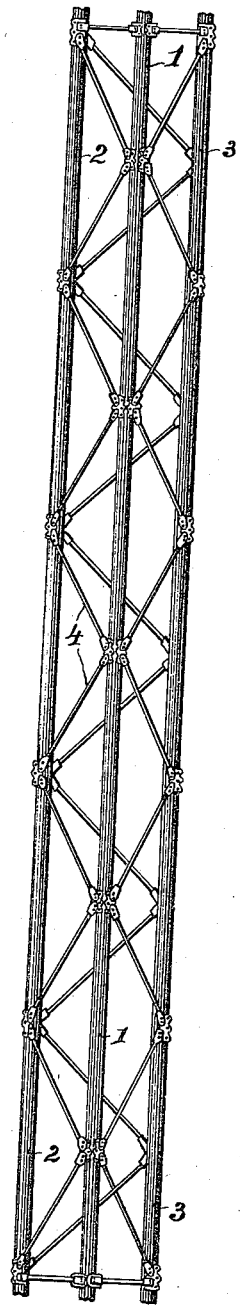
Figure 1 is a plan view of a tubular beam constructed with the joints of the present invention.
Figure 3:
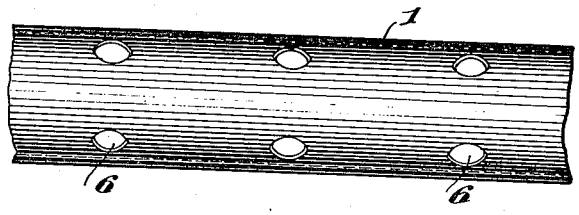
Figure 3 shows a section of a tubular girder, the auxiliary holes being shown in this view.
Figure 4:
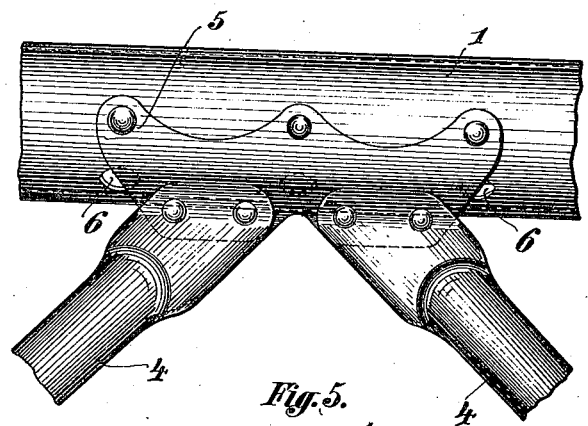
Figure 4 shows the intermediate coupling member secured to the beam.
Figure 5:
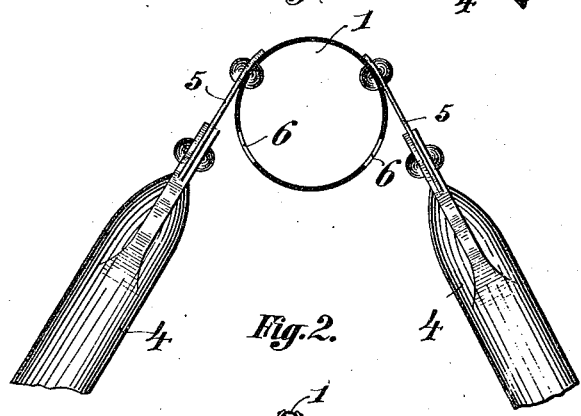
Fig. 5 is a sectional view of the beam with the coupling members on each side thereof.
Figure 2:
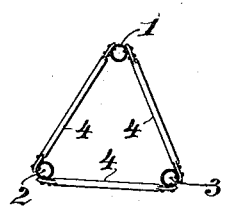
Figure 2 is a cross section of the beam shown in Figure 1.

In the embodiment of this invention shown in Figs. 1-5 the girder is composed of continuous tubular ties 1, 2, 3 and the braces 4, which are likewise of a tubular section. The braces are flattened at the ends and riveted to the joint plates 5, which plates are riveted to the pipes 1, 2, 3. To permit this riveting to be performed, auxiliary holes 6 are drilled into the pipes 1, 2, 3 opposite the rivet holes proper. By the joint plates being suitably formed these holes may be so disposed that both the rivets and also the holding-up tools may be introduced into the closed pipes, 1, 2, 3, so that the riveting may be performed without difficulties. The girder may be constructed of any suitable section other than the one shown in the drawing.

The making of pipe joints, such as occur in the ties of pipe girders cause much difficulty in riveting as the joint must, for the purpose of avoiding an unnecessary amount of material, extend over the pipe, so that it has the same strength as the unjointed pipes. This condition is met with in the case of a compression strain on the joint shown in Fig. 6 of the accompanying drawing. In case of tensile strains there indeed remains the unavoidable weakening by the first row of rivets. This, is, however, in most cases, of minor importance, as the pipes generally have a sufficient sectional area, so that they will bear the weakening for tensile strains. In the constructional form shown in Figs. 6 to 13 the pipes to be joined are numbered as 13 and the sleeves as 14. The latter may be either made to be inserted into or to be slipped over the pipes, or may, as shown in Fig. 9, be made in form of a tubular fishplate composed of two parts, as $14^1$ and $14^2$ or more if desired. Through the auxiliary holes 15 shown in Fig. 6 the rivets may be riveted, for which purpose the auxiliary holes are disposed behind the first row of rivets, so that in front of the sections weakened by said rivet holes a part of the strain has already been taken from the pipes.

By the weakened pipe being attached to the fishplate by means of rivets and vice versa the walls of the pipes are reinforced in such a manner that provided the proper number or rivets has been employed fractures are not likely to occur in the joint itself but only in front of it. Fig. 6 illustrates the disposal of the rivets and the auxiliary holes in such a manner that from each hole 4 rivets may be riveted. The joint may also be further secured by hollow rivets $12^1$ being subsequently drawn through the said auxiliary holes, such hollow rivets being made of any suitable material. This is shown in Fig. 10. In many instances it will be possible, as shown in Fig. 8, to first rivet the joint tube to one pipe. This may be performed without auxiliary holes. The consequence will be that such riveting may be performed more easily and quickly, and besides the length of the joint and its weight may be smaller as the space for the auxiliary holes is saved. In cases where it is not possible to push one pipe axially over the joint pipe riveted to the other pipe, the arrangement may be such that the joint pipe is made, as shown in Fig. 9, of two parts $14^1$ and $14^2$, one of said parts being previously riveted to each of the pipes to be joined. By such arrangement the safety is increased as the weakening through the auxiliary holes is reduced by one half; furthermore the advantage is obtained that one half of the rivets may be set from in front without auxiliary holes. This arrangement is of importance in case a pipe has to be fitted between two already stationary pipes. The joints described may also be employed in cases where the joint plate has a different shape, for example the one shown in Fig. 11, wherein a plate $14^3$ and a plate $14^4$ are used.

As shown in Fig. 10 hollow rivets may be used in the joints shown in Figs. 6 to 11, which hollow rivets $12^2$ are inserted into the auxiliary holes and are riveted over at their two ends projecting from the pipe. For the purpose of saving both in material and in weight hollow rivets $12^2$ are employed, as shown in Figs. 12 and 13 of such a length that they only pass through the walls of the two pipes to be joined and project only so far at both ends that they can just be riveted over. Fig. 12 is a longitudinal section through two pipes 16 and 17, the one fitted into the other, and secured by means of rivets 18.

What I claim is:

1. A joint comprising two members adapted to be secured together by rivets passed through them, one of said members being tubular and having an open end, but the interior of such member being inaccessible to the introduction of rivets thereinto through said end, means being provided in said tubular member whereby the interior thereof is rendered accessible to the rivets from the exterior thereof, to permit the rivets to be introduced into the interior of said member, and subsequently passed through said member to be headed.

2. A joint comprising two members adapted to be secured together by rivets passed through them, one of said members being tubular, means being provided in the side of said tubular member to permit the rivets to be introduced into the interior of said member and subsequently passed through said members to be headed, the interior of said tubular member being rendered accessible to the rivets and rivet manipulating means from the exterior thereof only by said means.

3. A joint comprising two members adapted to be secured together by rivets passed through them, one of said members being tubular and its interior adjacent the rivets being inaccessible from the end of said member, means being provided in said tubular member whereby the interior thereof is rendered accessible from the exterior thereof, to permit the rivets to be introduced into the interior of said member and subsequently passed through said members to be headed, said means being provided in the side of said tubular member opposite the side at which the rivets are located.

4. A joint comprising two members adapted to be secured together by rivets passed through them, one of said members being tubular and its interior adjacent the rivets being inaccessible from the ends of said members, holes being provided in said tubular member whereby the interior thereof is rendered accessible from the exterior thereof, to permit the rivets to be introduced into the interior of said member and subsequently passed through said members to be headed; and means for closing said holes after the rivets are set.

5. A joint comprising two members adapted to be secured together by rivets passed through them, one of said members being tubular and its interior adjacent the rivets being inaccessible from the ends of said members, holes being provided in said tubular member whereby the interior thereof is rendered accessible from the exterior thereof, to permit the rivets to be introduced into the interior of said member and subsequently passed through said members to be headed, and hollow rivets provided in said holes whereby the strength of the joint is increased.

6. A butt-joint comprising two tubular members to be joined; and a coupling member in overlapping engagement with the two tubular members, the latter having open ends, one of said tubular members being riveted to the coupling member in the usual manner by introducing the rivets into the interior of the tubular member through the open end thereof, the interior of the other tubular member being rendered inaccessible from the exterior thereof by the butt-joint, means being provided in the latter tubular member whereby the interior thereof is rendered accessible from the exterior thereof, to permit the rivets to be introduced into the interior of said member and subsequently passed through the tubular member and the coupling member to be headed.

7. A joint comprising two members adapted to be secured together by rivets passed through them, one of said members being tubular and its interior adjacent the rivets being inaccessible from the ends of said members, holes being provided in said tubular member whereby the interior thereof is rendered accessible from the exterior thereof, to permit the rivets to be introduced into the interior of said member and subsequently passed through said members to be headed, and hollow rivets provided in said holes whereby the strength of the joint is increased, the length of said hollow rivets corresponding to the combined thickness of the walls of the tubular member and the member secured thereto.

In testimony whereof I have affixed my signature.

JOHANN SCHÜTTE.